(12) United States Patent
Cathenaut et al.

(10) Patent No.: US 6,216,472 B1
(45) Date of Patent: Apr. 17, 2001

(54) PROCESS AND APPARATUS FOR MOLDING ICE CONFECTIONERY WITH SEPARABLE MOLD PARTS

(75) Inventors: Philip Igor Cathenaut, Beauvais; Bruno Delande, Marseille En Beauvaisis; Nicolas Marianovic, Beauvais, all of (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/310,391

(22) Filed: May 12, 1999

(30) Foreign Application Priority Data

May 13, 1998 (EP) .................................................. 98201563

(51) Int. Cl.[7] ...................................................... A23G 9/10
(52) U.S. Cl. .............................. 62/72; 62/345; 425/126.2
(58) Field of Search ........................ 62/345, 72; 425/116, 425/126.2, 451; 426/389, 421, 515

(56) References Cited

U.S. PATENT DOCUMENTS

| 2,582,074 | 1/1952 | Sebring | 107/8 |
| 4,396,367 | 8/1983 | Gram | 425/441 |
| 4,413,461 | * 11/1983 | Waldstrom | 425/126.2 |
| 4,505,121 | 3/1985 | Gram | 62/60 |
| 4,546,615 | * 10/1985 | Gram | 62/345 |
| 4,548,573 | 10/1985 | Waldström | 425/442 |
| 5,359,858 | 11/1994 | Miller et al. | 62/71 |
| 5,394,707 | 3/1995 | Miller et al. | 62/345 |

FOREIGN PATENT DOCUMENTS

| 4035720A1 | 5/1992 | (DE) | B29C/45/42 |
| 989892 | 9/1951 | (FR) . | |
| 712909 | 8/1954 | (GB) . | |

OTHER PUBLICATIONS

Cenet Database Abstract, abstract of Probst, German Patent DE 40 35 720 (1992).

Patent Abstracts of Japan, vol. 7, No. 131 (C–169), abstract of Japanese Patent Document JP 58 043748A (1983).

* cited by examiner

Primary Examiner—Wiliam E. Tapolcai
(74) Attorney, Agent, or Firm—Vogt & O'Donnell, LLP

(57) ABSTRACT

Iced confectionery articles are prepared with two-part mold members transported within a heat-insulated compartment and in which a cryogenic gas is applied to the mold members for freezing product metered into the mold members. Each mold member part is integral with a bar member to provide bar member and mold member part sets, and the sets are transported so that the first bar member of each set is driven so that it contacts and pushes the second bar member and so that the mold member parts fit together to form a mold member which defines a cavity for receiving and containing a product for being molded and so that after having frozen product in the mold members, and under dry conditions, bar member and mold member part sets are transported so that the second bar member is driven and the first bar member is transported so that the second bar member and the second mold part are parted away from the first bar member and first mold member part for separating the two parts of the mold members one from the other and from the frozen product so that a frozen product article formed by the freezing may be transported away from the mold parts.

29 Claims, 4 Drawing Sheets

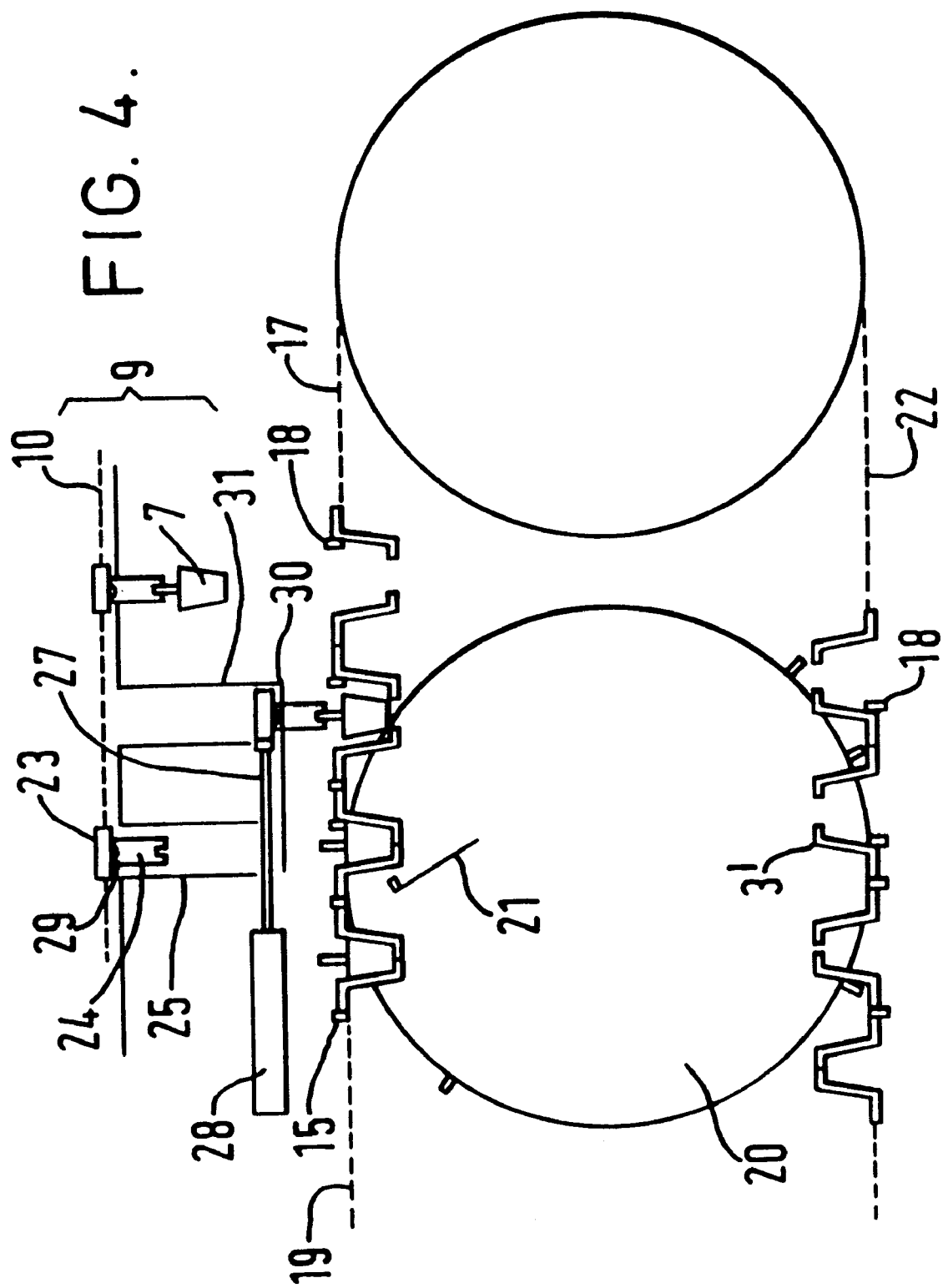

PROCESS AND APPARATUS FOR MOLDING ICE CONFECTIONERY WITH SEPARABLE MOLD PARTS

BACKGROUND OF THE INVENTION

The present invention relates to preparing iced confectionery articles, in particular, iced lollipops, and to molds and equipment for mold transport and to means for freezing compositions for preparing the ice confectionery articles.

U.S. Pat. Nos. 5,359,858 and 5,394,707 disclose processes and apparatus for molding simple or composite iced lollipops comprising chocolate shells, wherein molds are precooled to a very low temperature, a liquid composition to be iced is introduced into the molds which are conveyed through a refrigerating atmosphere until a crust is formed on the surface, a stick is inserted into the still soft center, and the iced lollipops then are removed from the molds. All the operations of precooling the molds, filling, inserting the stick and freezing until removal from the molds take place in a very cold environment, in which the ice cooling rate is controlled, so that the lollipops can easily be removed from the molds, without the molds being heated.

SUMMARY OF THE INVENTION

The object of the present invention is to make available a method and an apparatus which are simple and flexible and which allow high-productivity industrial production of small iced confectionery articles, in particular iced lollipops, by rapid freezing to a very low temperature to give the iced confectionery a fine texture.

The present invention provides a method for manufacturing small iced confectionery articles, in particular iced lollipops, in which a composition to be iced is introduced into molds, and the molds containing the composition are conveyed through a refrigerating atmosphere to freeze the composition and during the freezing, in which a stick is inserted into the composition being frozen and in which the molded articles are removed from the molds without heating characterized in that molds are used which are formed from two mold parts which are "half-shells" which define a cavity and which are fitted together to form molds having a mold cavity for molding an article, in that the freezing of the articles takes place in a heat-insulated compartment, by the application of a cryogenic gas to the molds, and in that removal from the molds takes place under "dry conditions" by the extraction of the articles after the two parts which form the molds have been parted and separated, "dry conditions" herein meaning that since the iced article prepared is not heated at its surface, and therefore melted, no liquid is formed.

The invention also provides apparatus for carrying out the process described above and which comprises a freezing compartment, a mold-filling station, a stick-depositing station and a station for extracting the articles, characterized in that the molds comprise two mold parts which are "half-shells" which have a surface which defines a cavity and each of which are separately integral with a bars transported step-by-step and in-line by a conveyor having two lateral chains, in that the compartment is heat-insulated and is cooled by means of a cryogenic gas applied to the surface of the molds, in that the apparatus comprises a molding section in which the mold part half-shells are fittable together one against the other to provide molds which define a cavity for preparing molded articles, and in that the apparatus comprises a mold-removal section in which a device for extracting the articles comprises means for parting and separating the mold parts and means for extracting the articles by their sticks.

The invention is described in more detail by way of illustration with the aid of the accompanying drawing Figures.

BRIEF DESCRIPTION OF THE DRAWING FIGURES

FIGS. 3 and 4 are diagrammatic views which show molded article removal from the mold parts.

DETAILED DESCRIPTION OF THE DRAWING FIGURES

Figure 1:
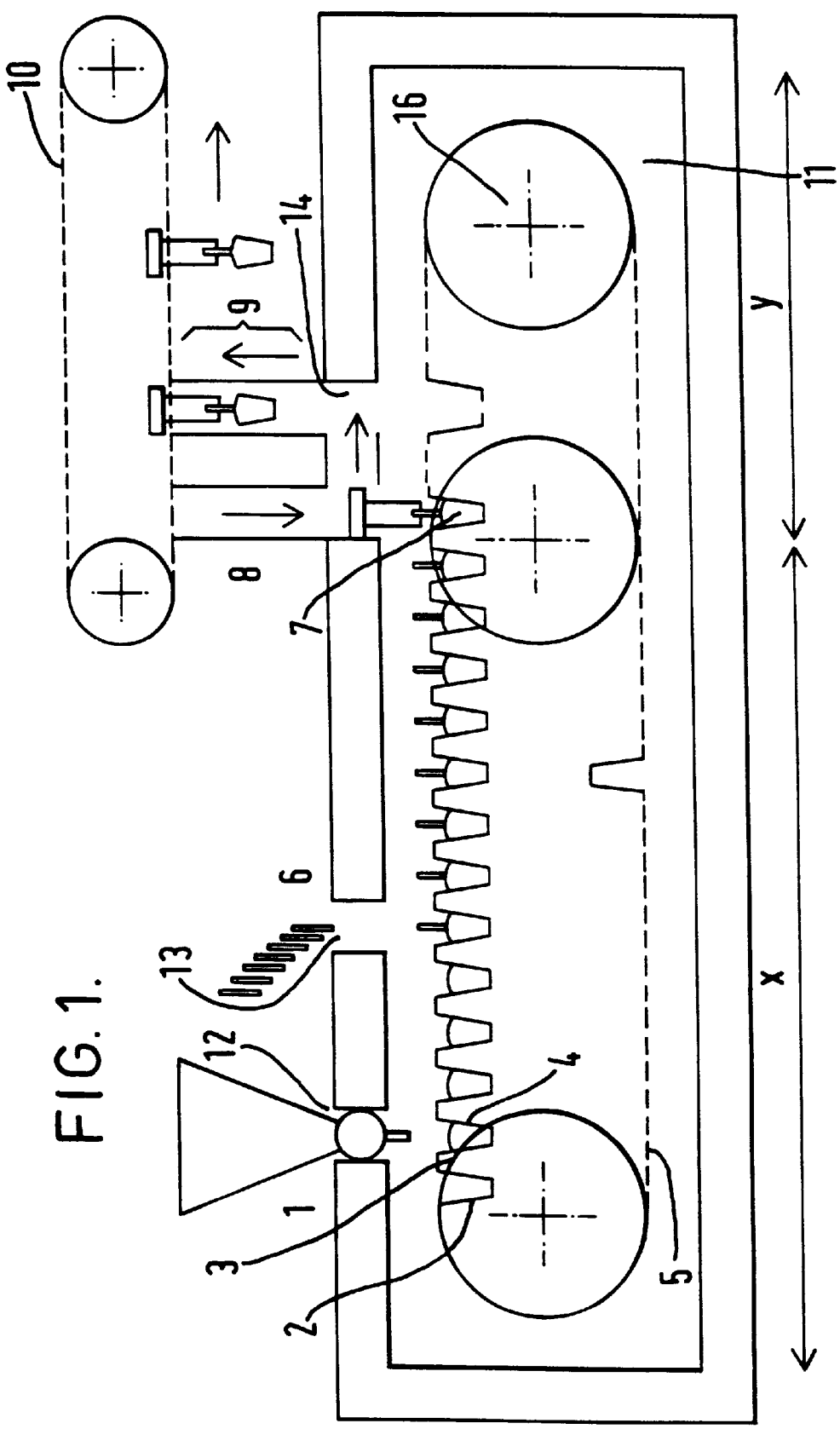
FIG. 1 is a diagrammatic sectional view of an apparatus according to the present invention.

As illustrated in FIG. 1, the apparatus comprises a molding section X and a mold removal section Y. In molding section X, a metering device located at the station 1 dispenses what is designated below as "ice". The ice may be an aqueous mixture of water ice or of ice based on an emulsion of fatty substance and in-line by a conveyor having two lateral chains, of proteins and may contain inclusions, and upon dispensing, the mixture may swell to a greater or lesser extent. The ice is dispensed into molds 2 formed by two mold part half-shells which are integral with a set of two bars 3, 4, the bars being, as illustrated, in contact one against the other by means of the step-by-step conveyor 5. The vertical configuration of the molds makes it possible for the molds to receive and contain liquid products metered and dispensed to the molds.

Preferably, a "hard" ice at −6° C. or −7° C., of which the percentage of frozen water is at least 50%, may be dispensed by means of a special metering device having a pressurized hopper, as described in European patent application No. 98201562 which is entitled "Method and device for the moulding of iced confectionery articles" and as described in its U.S. counterpart application Ser. No. 09/310,390 which was filed May 13, 1998, the contents of these applications being incorporated herein by reference.

At the station 6, a stick applicator, located a short distance from station 1, drives sticks, made of wood or plastic, into the centre of the semi-hardened ice mass. After complete hardening, the blanks 7 are removed from the molds under dry conditions as a result of the action of the elements described below. After they have been extracted at the station 8 by means of a double raising and lowering system 9, the blanks 7 are picked up by grippers integral with extraction bars and are transferred by means of the conveyor 10 towards conventional operations of coating, for example with a fatty covering or with water ice, and of wrapping.

The stations of the apparatus are contained within a heat-insulated compartment 11, and the compartment comprises orifices 12, 13 and 14 in its top wall the metering device at the station 1, the stick applicator at the station 6 and the extraction system at the station 8 to allow this equipment to pass through the compartment wall. Preferably, these orifices are defined in such a way that the equipment conjoins the compartment in order to minimize cold losses. The compartment also can be opened to make access to the interior easier. The thermal insulation of the compartment may be obtained, for example, by means of double walls with a vacuum between the walls.

Figure 2:
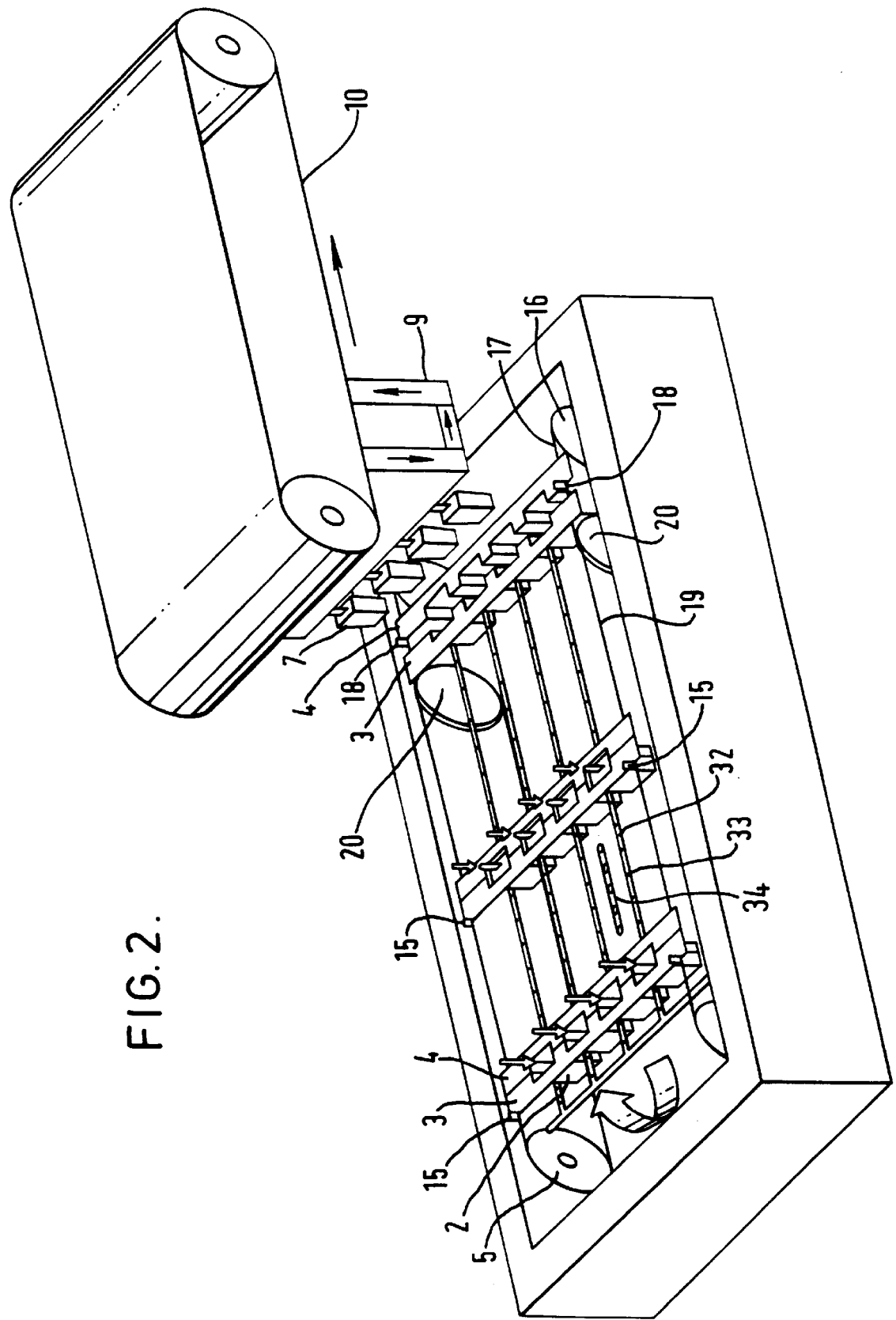
FIG. 2 is a partial diagrammatic perspective view of an apparatus according to the present invention.

As shown in FIG. 2, the system for transporting the molds 2 depends on the configuration of the mold bars 3, 4 and on the method of opening the molds for product article removal.

The conveyor 5 comprises two parts, an upstream part devoted to molding the articles and a downstream part devoted to removing the articles from the molds. In the molding section X, the molds 2 are transported in a closed position, and all the sets of bars 3 and 4 are pushed together to touch one another, so as not to lose any space and so as to conserve the cold. In the mold-removal section Y, which is much shorter than the molding section X, the molds 2 are transported in an open position wherein the mold part half-shells of each mold are separated and spaced apart one from the other.

For carrying out the parting and separation opening of the molds 2, the conveyer 5 is provided with two double dog chains. The function of the dogs 15 is to push each set of bars 3, 4 which, however, are not fastened to the dogs. The pitch, that is to say the distance between two dogs, is such that in the molding section X all the sets of bars 3, 4 are in contact. In the mold-removal section Y, the pitch is increased by the parting distance of the mold bars which is necessary for extracting the frozen product article blanks 7. This operation is easily carried out as a result of conveyance by two double chains.

Figure 3:
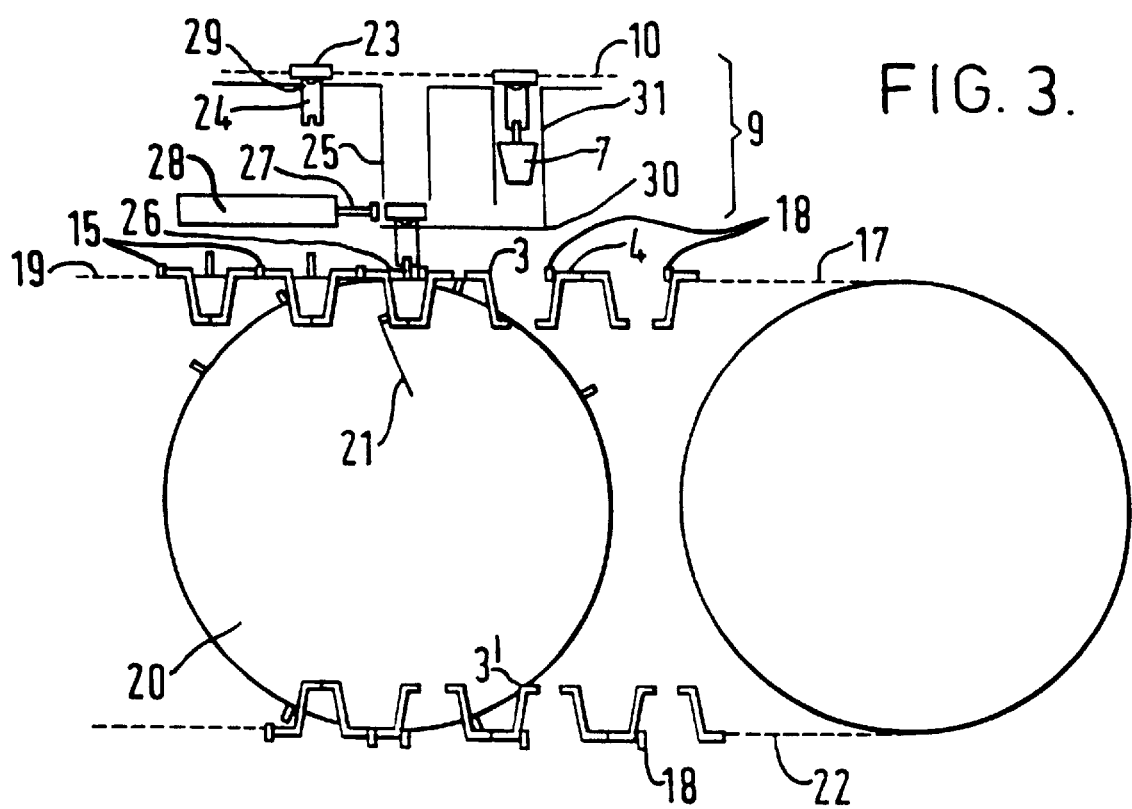

As illustrated more particularly in FIGS. 3 and 4, in the molding section X, the bars and their integral mold parts are driven by the dogs 15 which push the bars 3 which, in turn, push the bars 4, and in the mold removal section Y, the bars 4 and their integral mold parts are driven by the dogs 18 which push the bars 4 which, in turn, push the bar 3 of a preceding set of bars 3 and 4.

Further for carrying out the bar and mold part transport, the conveyor 5 comprises a primary wheel/drive-hub assembly 16 which exerts a pulling action at the end of the line, in the same way as for a conventional conveyor (the drive system is not illustrated). The primary double chain 17 conveys the molds into the mold-removal section Y. Fastened to the primary chain 17, the dogs 18 for pushing the mold bars are at a distance of two pitches from one another. The pair of primary chains 17 drives a pair of secondary chains 19 by means of engaging two intermediate gearwheels 20. Fastened to the pair of secondary chains 19 are the drive dogs 15 which are at a distance from one another equal to the width of a set of bars, that is to say one pitch. The primary chains 17 engage on the internal side of the intermediate wheels 20, whereas the secondary chains 19 engage on the external side of the intermediate wheels 20. The double chains therefore cannot be wound one onto the other.

The parting and separation of the bars 3, 4 and the opening of the molds takes place as indicated diagrammatically in FIGS. 3 and 4. In the region where the chains intersect, the dogs 18 of the primary chain 17 engage into the aperture formed between the half-bars 3 and 4. At the next stroke, the rear bar 3 of the secondary chain 19 advances one pitch, whilst the front bar 4 advances two pitches, this representing the distance between two successive dogs 18 of the primary chain. With respect to the bars, the expressions "rear" and "front" denote their relative position in relation to the direction of advance of the bars. The change of chain is made possible by continuous guide rails (not illustrated) used conventionally in chain conveyors and by the fact that the dogs 15 and 18 can cross one another in the region of the intermediate wheel 20.

In the region where the molds are separated, an element 21, for example a hammer, makes it possible to generate small shocks which assist in removing the blanks 7 from the molds under dry conditions.

On the return strand 22 of the primary chain 17, the closing of the mold bars takes place in the opposite direction to what was described with regard to the outgoing strand, the mold bars then being taken up by the dogs 18 which act by pushing the front bar 4 which, by reversal, has become a rear bar 3'.

A variant of the traction system could be a primary traction element consisting of a single pair of wheels 20, one wheel 20 being externally toothed, in order to drive the secondary chain 19 of the molding section, and integrally carrying dogs for separating the mold bars for removal of article blanks from the molds.

The extraction of the blanks 7 from the molds is carried out with extraction bars 23, of conventional design, which carry grippers 24 and which are integral with the conveyor 10. The bars 23 descend by means of the raising and lowering system 25, and the grippers 24 grasp the blanks by their stick 26. At the next stroke, the blank 7 is released as a result of the advance of the mold bars 3 and 4 and their parting from one another, if appropriate, with the aid of the element 21, whilst the extraction bar 23 is pushed by the rod 27 of the jack 28 located horizontally in front of the extraction device 9. The movability of the extraction bars 23 is ensured by rollers 29 which are fastened to the two ends of the extraction bars and which roll on a pair of short rails 30. As soon as the releasing position is assumed, the extraction bar 23 rises, together with the blanks 7, by virtue of the raising and lowering system 31, in order to be engaged in the two chains of the conveyor 10, which ensures that it is displaced towards subsequent processing, for example towards stations for covering with a chocolate-flavoured coating or with sorbet, for depositing dry appendages and for wrapping (these stations not being illustrated).

In the molding section X, the ice is frozen in molds formed by the mold half-shell parts which are integral with bars 3 and 4. The mold parts preferably are made of stainless steel with a thickness of 0.5 to 1 mm. Manufacturing the mold parts by pressing makes it possible to minimize the thickness of the metal wall and thus improve thermal transfer. The mold parts may be made of nickel in order to bring about better thermal exchange, but they are easier to manufacture if pressed stainless steel is used. The mold parts need not be exactly symmetrical, but complementary, that is to say, one of them may fit slightly into the other so as to improve the contact connection. Finally, the inner wall, or surface, of the mold parts which defines a cavity may be covered with a non-wetting material of food-compatible quality, such as, for example, a TEFLON composition, polyethylene, or other materials, and mold parts having a polished electrolytic cavity surface, which may be carried out by electrolysis or by any other means for obtaining a "mirror polish".

The mold parts and bars may be welded together, the bars being thick or angled stainless-steel, in order to ensure that the molds are rigid and orthogonal on their rails (not illustrated). A plurality of sets of molds may be provided side by side on a set of mold bars, thus resulting, for example, in 8 to 14 tracks. The mold parts may be configured to produce identical or different articles on the various tracks, and this may make it possible to manufacture different articles at the same time on the same machine, and since the molds comprise two parts, articles which are, for example, in relief, known as "three-dimensional or undemoldable", can be manufactured.

The thorough freezing of the ice may take place in the molding section X of the apparatus, but this is not mandatory. The molds are already very cold when the ice is metered, thereby affording the advantages of the immediate freezing of the ice on the surface, thus preventing it from escaping between the two half-shells of the molds and not adhering to the walls of the molds. However, we have found that as soon as the stick is fastened sufficiently in the mass to be frozen, that is to say as soon as the hold of the stick is sufficient to make it possible to extract the article, there is a reserve of low-temperature cold which makes it possible to complete the freezing of the product when it has already come out of its mold. There is a decrease in the temperature gradient between the surface and the center of the article, and its thorough freezing may continue after removal from the mold.

According to the invention, the "cryogenic gas" consists of cryogenic fluid mixed with a carrier gas cooled by the cryogenic fluid. The carrier gas consists of recycled vapor or of dry air cooled by the recycled vapor or of a mixture of dry air and recycled vapor.

The cryogenic gas may be applied to the surface of the molds continuously or by pulsation. This is carried out by means of longitudinal banks 32, located between each track, and of nozzles 33. The nozzles 33 have the property of spraying a cryogenic fluid, for example liquid nitrogen, horizontally over an angle of 360° and of thereby ensuring complete evaporation of the fluid so as to be certain of the best possible turbulence of the cryogenic gas in contact with the mold. The presence of the carrier-gas dispensing bank 34 (only one element of which is illustrated for the sake of clarity in the diagram) makes it possible to improve the turbulence and atomization of the cryogenic fluid. Another advantage of the carrier gas is that it consists itself of sucked-up and recycled cryogenic fluid vapors, thus making it possible to make savings in terms of the quantity of cryogenic fluid consumed. Condensation is also limited, since the vapors are dry. The vapors may also be recycled in an exchanger, in order to cool dry air under a controlled pressure, so as to improve the atomization of the cryogenic fluid and increase turbulence.

The combined use of the cryogenic-fluid atomizing nozzles and of the carrier-gas spraying nozzles makes it possible to limit the number of nozzles, whilst at the same time ensuring the best possible exchange. The combination of the two circuits allows flexibility in controlling the temperature from −40° C. to −150° C., so as to find the best compromise between productivity and energy efficiency, and the apparatus and process may thus serve for cooling the product to a temperature of −18° C.

Thus, by controlling the temperature in the compartment by adjusting the spraying of liquid fluid, for example nitrogen, and the extraction of the gases (by a means not illustrated), provision may be made for freezing the ice thoroughly within ½ min. to 6 mins., depending on the shape, volume and recipe of the article, for example within 1.5 to 2 mins. for a customary iced stick lollipop, at a rate of 20 to 30/min. With 12 tracks, the apparatus can thus produce, for example, more than 20,000 iced stick lollipops/h.

What is claimed is:

1. A process for preparing iced confectionery articles comprising transporting members for forming molded articles within a heat-insulated compartment wherein each member is a set which comprises two bar members and two parts for forming a mold member wherein a first mold part is integral with a first bar member and a second mold part is integral with a second bar member, wherein each mold part is configured to define a cavity and wherein the bar members and mold parts are configured and transported so that the first and second bar members are contactable and so that the mold parts and their cavities are fittable together for forming a mold member which defines a cavity for receiving and containing a product for being molded into an article and comprising during the transporting:

transporting the bar member and mold part sets so that the first bar member of each set is driven so that the first bar member contacts and pushes the second bar member and so that the mold parts and their cavities fit together to form a mold member which defines a cavity for receiving and containing a product for being molded;

introducing into the cavity of the mold members a substance for preparing an ice confectionery article;

applying a cryogenic gas to the mold members containing the product introduced therein for freezing the product and during the freezing, inserting a stick into the product being frozen in the mold members, and upon freezing for a time so that the product being frozen is supportable by the stick, under dry conditions, transporting the bar member and mold part sets so that the second bar member is driven and the first bar member is transported so that the second bar member and the second mold part are parted away from the first bar member and first mold part for separating the two mold parts of the mold members one from the other and from the frozen product so that a frozen product article formed by the freezing may be transported away from the mold parts;

transporting the frozen article away from the separated mold parts; and removing the frozen article from the compartment.

2. A process according to claim 1 further comprising grasping the stick prior to separating the mold parts, and by means of the grasped stick, transporting the frozen article from the mold parts.

3. A process according to claim 1 further comprising after inserting the stick and prior to parting and separating the mold parts, generating shocks to the mold members for assisting removal of the frozen article from the mold parts.

4. A process according to claim 1 wherein a cryogenic fluid is sprayed to provide the cryogenic gas applied.

5. A process according to claim 4 wherein the cryogenic fluid is liquid nitrogen.

6. A process according to claim 1 further comprising introducing a carrier gas into the compartment so that the carrier gas is applied with the cryogenic gas.

7. A process according to claim 6 wherein the carrier gas is dry air.

8. A process according to claim 6 further comprising recovering the cryogenic and carrier gases from the compartment and recycling gas which comprises the carrier gas to the compartment.

9. A process according to claim 8 wherein the carrier gas is dry air.

10. A process according to claim 1 wherein the gas application is controlled so that the gas applied has a temperature of from −40° C. to −150° C.

11. A process according to claim 1 wherein the application of the cryogenic gas is controlled for freezing the product in a time of from ½ minute to 6 minutes.

12. A process according to claim 1 wherein the gas applied is pulsed.

13. A process according to claim 1 wherein the gas applied is applied continuously.

14. A process according to claim 1 wherein the product introduced into the mold members is an iced product comprising water wherein at least 50% of the water is frozen.

15. A process according to claim 1 wherein there are a plurality of lines of member sets which are aligned in parallel and which comprise a plurality of member sets.

16. A process according to claim 1 wherein the mold parts of the member sets aligned in parallel are configured differently for preparing differently shaped articles.

17. Apparatus for preparing frozen confectionery articles comprising:

a conveyor which comprises first and second endless parts which comprise parallel chains and which are linearly aligned for transporting members for molding an ice confectionery product and so that the members are transported from the first conveyor part to the second conveyor part;

a plurality of members for preparing molded articles wherein each members is a set which comprises two bar members and two parts for forming a mold member wherein a first mold part is integral with a first bar member and a second mold part is integral with a second bar member, wherein each bar member extends transversely to the parallel chains for transport of the bar members, wherein each mold part has a surface configured to define a cavity and wherein the bar member and mold part sets are configured and positioned so that the first and second bar members are contactable and so that the first and second mold parts and their cavities are fittable together for forming a mold member which defines a cavity for receiving and containing a product for being molded into an article;

means integral with the first conveyor part for driving the first bar member of the sets so that the first bar member contacts and pushes the second bar member and so that the first and second mold parts and their cavities fit together to form the mold members;

means integral with the second conveyor part for transporting the bar member and mold part sets so that the second bar member is driven and the first bar member is transported so that the second mold part of the mold member is parted away from the first mold part of the mold member for separating the two bar members and mold parts one from the other and from frozen molded product so that a frozen product article formed by the freezing may be transported away from the mold parts;

a heat-insulated compartment which contains therein the conveyor, the bar member and mold sets sets and the means for driving the bar members for fitting and separating the mold parts;

means which extend into the compartment for introducing a substance for preparing an ice confectionery article into molds in the compartment;

means for introducing a cryogenic gas into the compartment for contacting molds containing a substance for freezing for preparing ice confectionery articles;

means for inserting a stick in a substance being frozen in mold members in the compartment;

means for grasping the sticks of frozen articles in the compartment for removing frozen articles away from separated mold parts; and means for removing the frozen articles from the compartment.

18. Apparatus according to claim 17 wherein the means for driving the first and second bar members comprise dogs fastened to endless chains.

19. Apparatus according to claim 17 wherein the first conveyor part comprises a pair of parallel endless chains which carry dogs for driving the first bar members and further comprising a gear wheel assembly for driving the pair of first conveyor part chains and wherein the second conveyor part comprises a pair of parallel endless chains and dogs, fastened to the chains, for driving the second bar members and which engage the gear wheel assembly for driving the gear wheel assembly and the first conveyor part chains.

20. Apparatus according to claim 17 further comprising an element for contacting mold members containing frozen product for generating a shock for assisting subsequent removal of frozen product from the mold members.

21. Apparatus according to claim 17 wherein the mold part surface configured to define the mold part cavity is a polished surface.

22. Apparatus according to claim 17 wherein the mold part surface configured to define the mold part cavity comprises a food-compatible non-wetting material.

23. Apparatus according to claim 17 wherein the means for removing the frozen articles from the compartment comprises a further conveyor and wherein the grasping means is integral with the further conveyor and comprises means for moving the grasping means towards a mold members containing product being frozen and away from separated mold parts.

24. Apparatus according to claim 23 wherein the means for grasping comprises a bar and wherein the apparatus further comprises a jack which comprises a rod positioned for pushing the bar so that after a stick is grasped by the grasping means, the jack rod pushes the bar so that the grasping means moves with the stick and mold to a position for moving the grasping means away from separated mold parts.

25. Apparatus according to claim 24 wherein the grasping means further comprises rollers fastened to the bar and wherein the apparatus further comprises rails positioned so that the rollers roll on the rails so that upon the rod pushing the bar, the grasping means moves with the stick and mold to the position for moving the grasping means away from separated mold parts.

26. Apparatus according to claim 23 wherein the further conveyor comprises two chains and wherein the chains and grasping means are configured so that the grasping means is movable to the molds and away from separated mold parts.

27. Apparatus according to claim 17 wherein the compartment is configured to define an orifice via which the grasping means and the means for removing the frozen articles are conjoined and wherein the means and compartment are conjoined so that cold losses are minimized.

28. Apparatus according to claim 17 wherein there are a plurality of lines of member sets which are aligned in parallel and which comprise a plurality of member sets.

29. Apparatus according to claim 28 wherein the mold parts of the member sets aligned in parallel are configured differently for preparing differently shaped articles.

* * * * *

UNITED STATES PATENT AND TRADEMARK OFFICE
CERTIFICATE OF CORRECTION

PATENT NO.    : 6,216,472 B1
DATED         : April 17, 2001
INVENTOR(S)   : Philip Igor Cathenaut, et al.

Page 1 of 1

It is certified that error appears in the above-identified patent and that said Letters Patent is hereby corrected as shown below:

<u>Title page,</u>
Left column, in Item [75] Inventors, change "Marianovic" to -- Marjanovic --.

<u>Column 7,</u>
Line 4 (line 1 of claim 16), delete "1" and insert therefor -- 15 --.
Line 16 (line 10 of claim 17), change "members" to -- member --.
Line 46 (line 39 of claim 17), delete <u>one</u> occurrence of the word "sets".

<u>Column 8,</u>
Line 29 (line 6 of claim 23), change "members" to -- member --.

Signed and Sealed this

Sixth Day of November, 2001

Attest:

*Nicholas P. Godici*

*Attesting Officer*

NICHOLAS P. GODICI
*Acting Director of the United States Patent and Trademark Office*